United States Patent
Lacombe et al.

(10) Patent No.: US 6,443,533 B2
(45) Date of Patent: Sep. 3, 2002

(54) BICYCLE RIM STRUCTURE PROVIDED FOR A TUBELESS ASSEMBLY AND BICYCLE WHEEL

(75) Inventors: Jean-Pierre Lacombe, Marcellaz Albanais (FR); Jean-Pierre Mercat, Saint Trivier sur Moignans (FR)

(73) Assignee: Mavic S.A., Saint Trivier sur Moignans (FR)

( * ) Notice: Subject to any disclaimer, the term of this patent is extended or adjusted under 35 U.S.C. 154(b) by 0 days.

(21) Appl. No.: 09/883,359

(22) Filed: Jun. 19, 2001

Related U.S. Application Data

(63) Continuation of application No. 09/121,704, filed on Jul. 24, 1998, now Pat. No. 6,257,676.

(30) Foreign Application Priority Data

Jul. 25, 1997 (FR) .............................................. 97 09928

(51) Int. Cl.⁷ ................................................ B60B 1/02
(52) U.S. Cl. .................................... 301/95.104; 301/58
(58) Field of Search ....................... 301/58, 55, 95.101, 301/95.102, 95.103, 95.104, 95.105, 95.106, 95.107, 95.108; 152/381.3, 381.6, 427

(56) References Cited

U.S. PATENT DOCUMENTS

| | | | |
|---|---|---|---|
| 365,091 A | 6/1887 | Owen | 152/246 |
| 2,937,905 A | 5/1960 | Altenburger | 301/97 |
| 3,008,770 A | 11/1961 | Mueller | 29/512 |
| 5,228,756 A | 7/1993 | Krampera | 301/58 |
| 5,490,719 A | 2/1996 | Lew | 301/5.1 |
| 5,499,864 A | 3/1996 | Klein et al. | 301/95 |
| 5,509,438 A | 4/1996 | Leonard et al. | 137/231 |
| 5,538,058 A | 7/1996 | Aloy | 152/381.5 |
| 5,651,591 A | 7/1997 | Mercat et al. | 301/95 |
| 5,653,510 A | 8/1997 | Osborne | 301/95 |
| 5,718,485 A * | 2/1998 | Stach | 301/95 |
| 5,806,935 A | 9/1998 | Shermeister | 301/58 |
| 5,941,606 A | 8/1999 | Chen | 301/58 |
| 5,988,764 A | 11/1999 | Deetz | 301/95 |
| 6,089,672 A * | 7/2000 | Chen | 301/58 |
| 6,119,746 A | 9/2000 | Lacombe et al. | 152/415 |
| 6,155,651 A * | 12/2000 | Mizata et al. | 301/95 |
| 6,183,047 B1 * | 2/2001 | Kuhl | 301/58 |
| 6,257,676 B1 * | 7/2001 | Lacombe et al. | 301/58 |
| 6,293,629 B1 * | 9/2001 | Chen | 301/58 |

FOREIGN PATENT DOCUMENTS

| | | |
|---|---|---|
| DE | 2209551 | 9/1973 |
| DE | 3727051 | 2/1989 |
| DE | 4206311 | 9/1993 |
| DE | 4444044 | 6/1996 |
| EP | 0103724 | 3/1984 |
| EP | 0579525 | 1/1994 |
| EP | 0615865 | 9/1994 |
| EP | 0616911 | 9/1994 |
| FR | 2351803 | 12/1977 |
| GB | 2044189 | 10/1980 |
| WO | WO93/09963 | 5/1993 |

* cited by examiner

*Primary Examiner*—S. Joseph Morano
*Assistant Examiner*—Long Bao Nguyen
(74) *Attorney, Agent, or Firm*—Greenblum & Bernstein, P.L.C.

(57) ABSTRACT

A rim structure for a bicycle wheel that includes, at its periphery, an annular channel designed to receive a tire, such channel being demarcated by an upper bridge devoid of openings with the exception of the valve opening, and two lateral flanges, such flanges having end butts for gripping the tire. The upper bridge has a narrow and recessed central rim well demarcated by a base and two lateral walls, the rim well being bordered by two bead seats that are oblique from the rim well towards the flanges. The invention is also related to a wheel having such a rim and a wheel equipped with a tire mounted without an air tube and having such a rim.

22 Claims, 4 Drawing Sheets

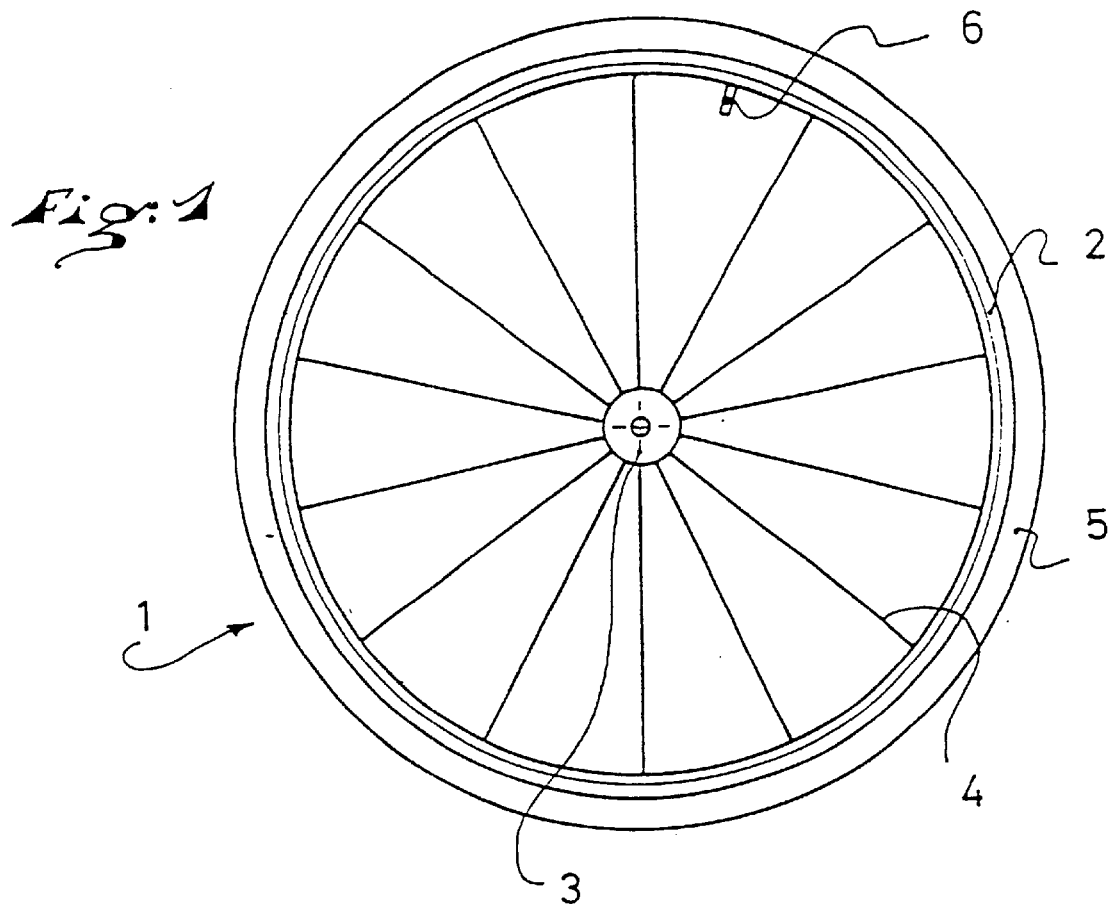
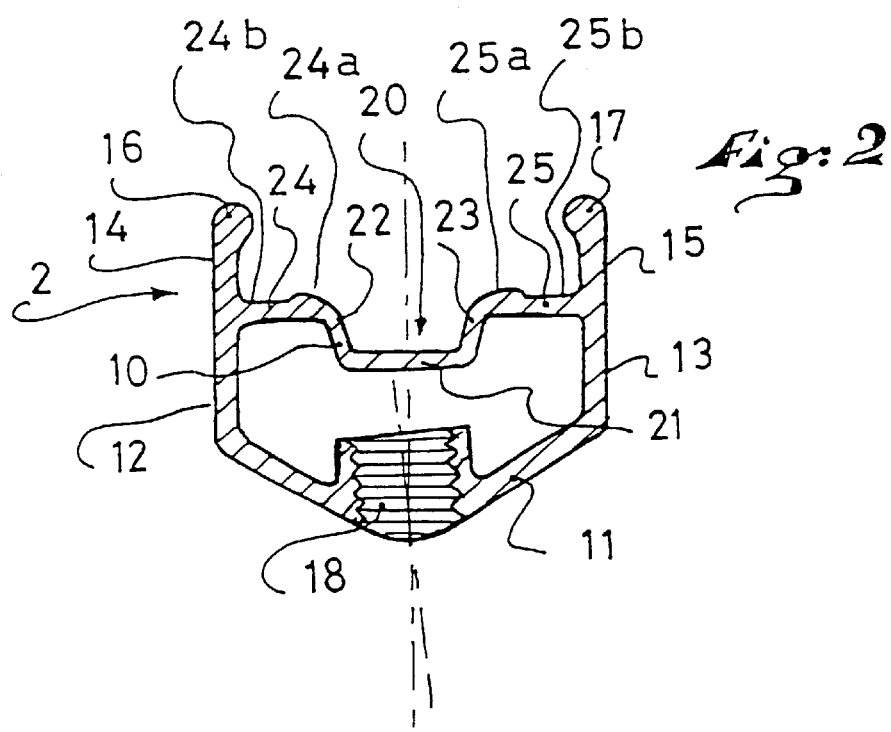

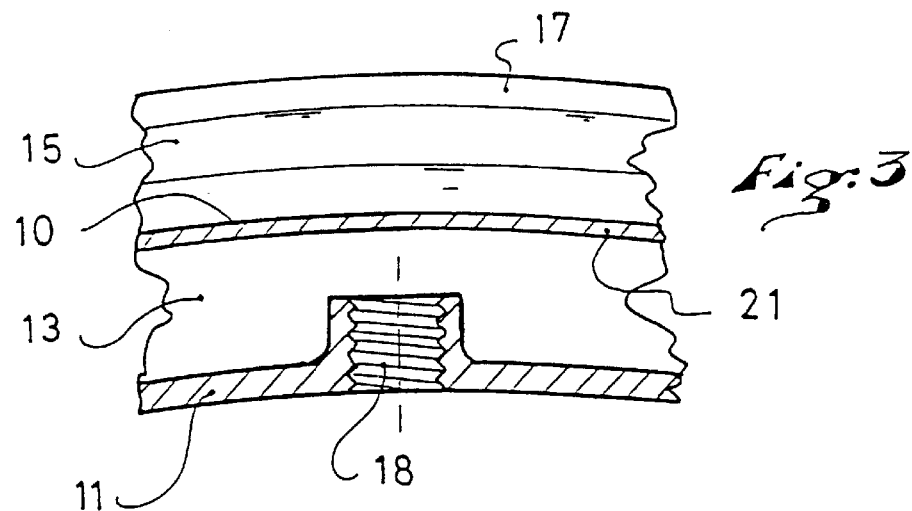
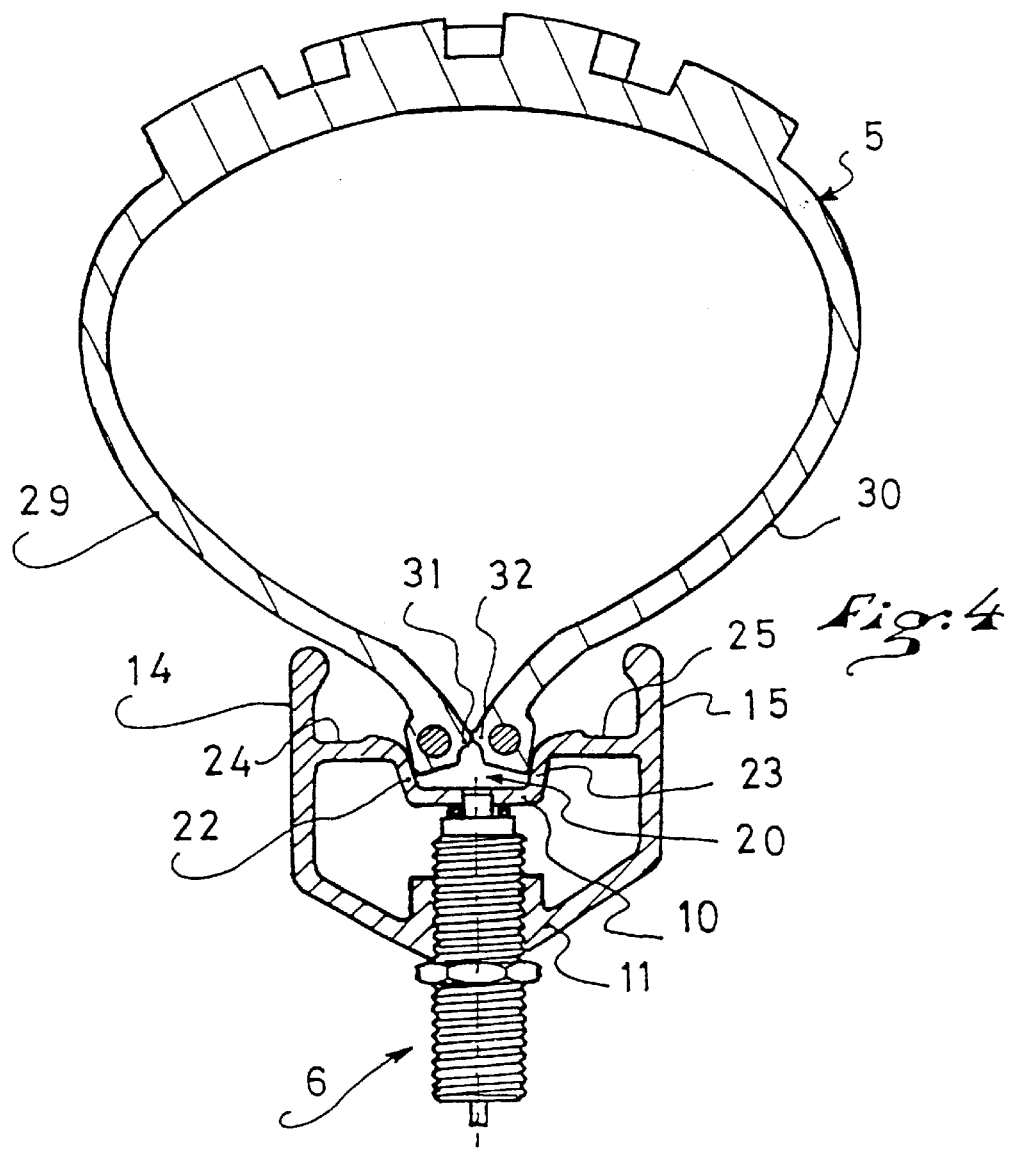

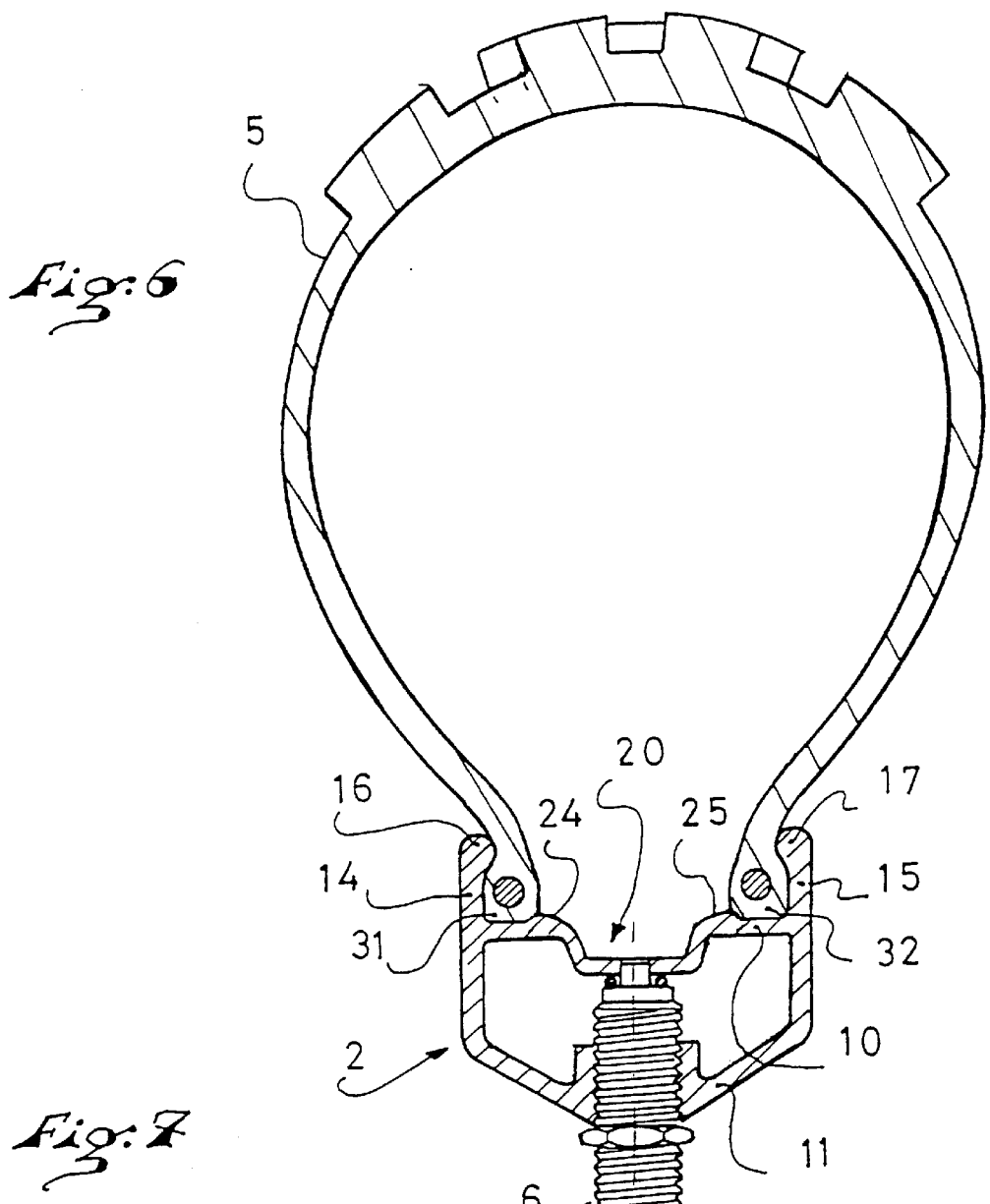
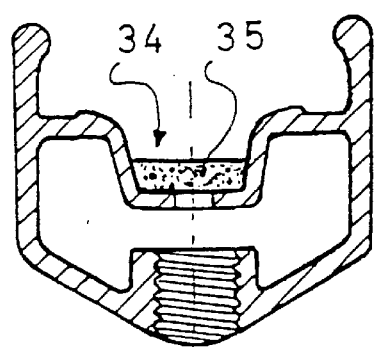

BICYCLE RIM STRUCTURE PROVIDED FOR A TUBELESS ASSEMBLY AND BICYCLE WHEEL

CROSS-REFERENCE TO RELATED APPLICATIONS

This application is a continuation of U.S. patent application Ser. No. 09/121,704, filed on Jul. 24, 1998 now U.S. Pat. No. 6,257,676, the disclosure of which is hereby incorporated-by-reference thereto in its entirety and the priority of which is claimed under 35 U.S.C. §120.

This application is also based upon French Application No. 97 09928, filed on Jul. 25, 1997, the disclosure of which is hereby incorporated by reference thereto in its entirety and priority of which is claimed under 35 U.S.C. §119.

BACKGROUND OF THE INVENTION

1. Field of the Invention

This invention is related to a rim structure for a bicycle wheel. The invention is also related to a bicycle wheel having such a rim, as well as to a wheel having such a rim equipped with a tire.

The invention especially relates to a rim of the butt or hook type that is designed for a so-called "tubeless" assembly, or in other words, without an air tube.

2. Description of Background and Relevant Information

In a known manner, a wheel has a rim and a hub connected to the rim via two sets of spokes. The rim generally includes two bridges connected to one another by lateral flanks that extend beyond the upper bridge via rim flanges so as to form an annular channel where the tire can become housed. At their upper portions, the rim flanges have a butt-like or a hooked portion whose function is to retain the tire after inflation. Normally, the bridges of the rim are bored with openings that are used for the passage or retention of the spoke nipples.

Tubeless assemblies for tires are known. Such an assembly is advantageous because it eliminates the cost, mounting and weight of an air tube. In addition, such an assembly makes the wheel equipped with the tire less prone to punctures due to pinching or perforation. A thorn, for example, that passes through the tire remains, in effect, embedded in its housing, so that hardly any air, or just a negligible amount of air, is lost.

In order to obtain a tubeless assembly of the tire, it has been known to block all the openings of the spokes by a sealed rim base. The patent application EP 615 865 discloses such a technique. However, it is difficult to seal all of the spoke openings. In order to remedy this, the above-cited application also proposes that the lips of the tire cover the edges of the rim base, so as to form a closed volume along with it. This requires a special type of tire, whose assembly is a delicate operation.

In order to overcome the sealing problem of the rim, the patent application DE 42 06 311 also proposes obtaining a rim whose upper bridge is not bored. The spokes are thus anchored in the openings of the lower bridge. The fact that the upper bridge is smooth, i.e., it has no holes except for the valve opening, resolves sealing problems in this area. In addition, such a rim is compatible with conventional tires. However, this solution gives rise to a sealing problem between the sides of the tire and the rim. The problem becomes apparent when the tire is inflated, especially if the inflation is done with a low output device, such as a manual pump, for example. In fact, when the tire is mounted on the rim, the tire is positioned along only a small portion the width of the upper bridge. Under these conditions, the quantity of air blown into the tire by a pump escapes at various points between the sides and the upper bridge, thereby achieving neither inflation, nor any seal.

This problem also becomes apparent while riding the cycle, if the tire is not adequately pressed against the sides of the rim. In case of a lateral impact, for example caused by a stone, the air can escape if the tire becomes removed from the rim, especially if its pressure is low. Indeed, in such a case, the sides of the tire are no longer pushed up against the rim flanges by the air tube.

SUMMARY OF THE INVENTION

An object of the invention is to propose an improved rim that is provided for a tubeless assembly of the tire.

Another object of the invention is to propose a rim whose contour improves tire inflation conditions.

Yet another object is to propose a rim whose contour improves the retention of the tire when it is inflated.

Other objects and advantages of the invention will become apparent from the following description.

The rim for a bicycle wheel according to the invention has an annular channel along its periphery which is provided to receive the tire, such channel being demarcated by an upper bridge devoid of openings with the exception of the valve opening, and two lateral flanges, such flanges having butts designed to grip the tire. The upper bridge has a narrow and recessed rim well demarcated by a base and two lateral walls, the rim well being bordered by two bead seats, at least partially inclined, so that the external diameter of the rim in the area of the bead seats decreases from the well towards the flanges.

The bicycle wheel according to the invention has a rim such as defined previously.

BRIEF DESCRIPTION OF THE DRAWINGS

The invention will be better understood with reference to the following description and the annexed drawings that form an integral part thereof, wherein:

FIG. 1 shows a side view of an entire wheel equipped with a tire;

FIG. 2 is a front sectional view of a rim contour according to a preferred embodiment of the invention, in the area of a spoke gripping opening;

FIG. 3 is a side sectional view of a portion of the rim represented in FIG. 2;

FIGS. 4, 5 and 6 represent a sectional view of the rim equipped with its tire, and illustrate the various inflation phases of the tire; and FIG. 7 is related to an alternative embodiment of the rim.

DETAILED DESCRIPTION OF THE INVENTION

Figure 5:
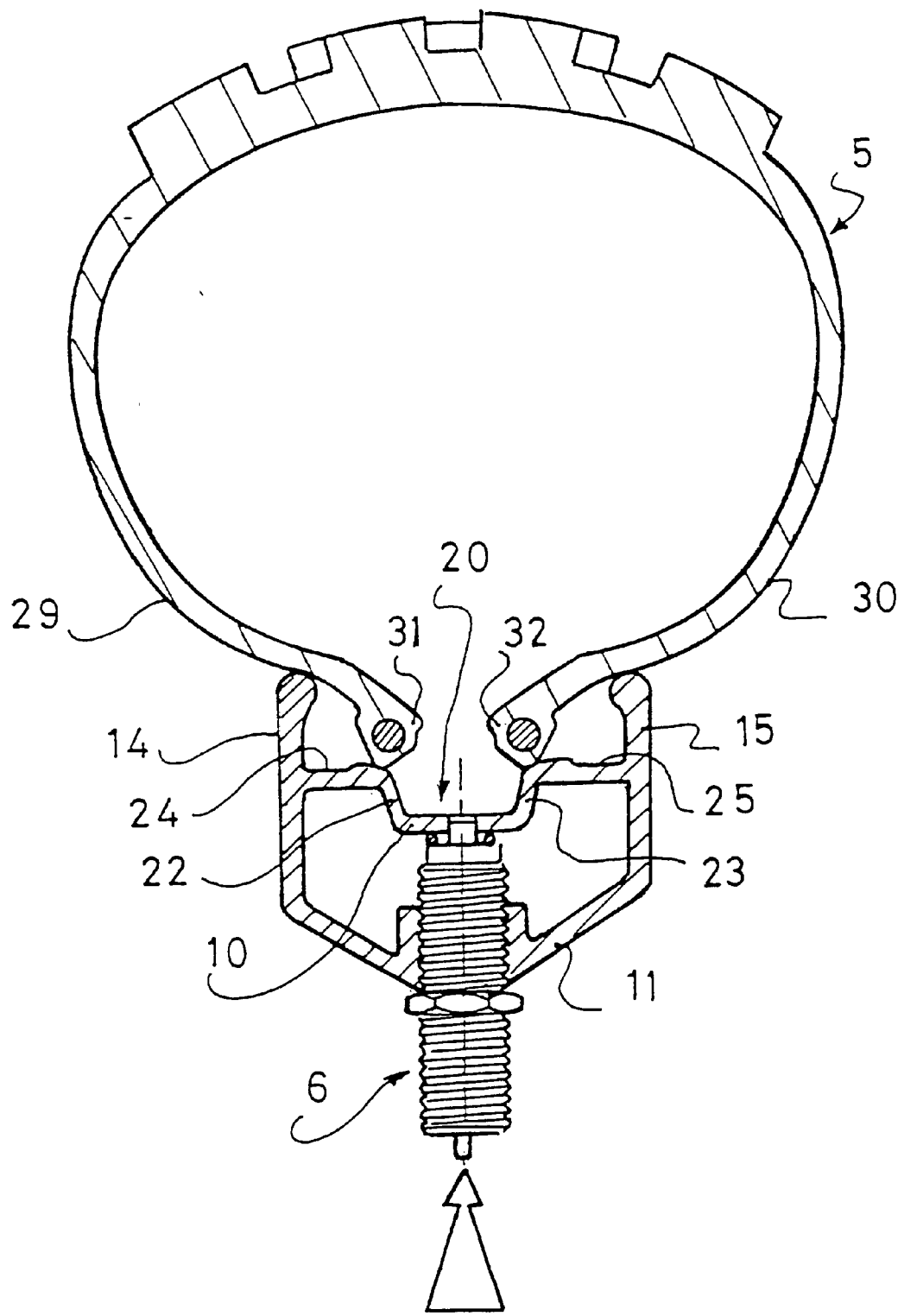

FIG. 1 represents a wheel 1 that includes, in a known manner, a rim 2 connected to a central hub 3 via two sets of spokes. Only the set of spokes 4 is visible in FIG. 1. The spokes are of any appropriate type, straight or bent, and their arrangement can be either radial or criss-crossed. In addition, the wheel can be any wheel, be it the front or the rear wheel.

In a known manner, the rim is made from a section made of a light alloy, aluminum or otherwise, that is curved in a circle and whose two ends are preferably assembled together by welding, so as to obtain a good seal in this area.

The wheel 1 represented in FIG. 1 is also equipped with a tire 5. The tire 5 is a tire having normal dimensions. The dimensions of the tire correspond to those defined by the standard ISO 5775-1 for example.

In a known manner, such a tire has a central running tread that is bordered by two lateral sides. The base of the lateral sides, or bead, is thicker and encloses a rigid or flexible rod whose length has been defined. This rod is deformable, and it is made from a metallic wire or from a non-metallic material. At rest, its length is an important dimension of the tire and it defines the inner diameter of the tire at rest. This diameter is adapted to the nominal diameter of the rim, i.e., the diameter of the upper bridge of the rim, when measured along the retention flange for the tire, corresponds for example, to the nominal diameter defined by the standard ISO 5775-2. Depending on the tires, the inner diameter can vary within fairly wide tolerances, especially depending on the thickness of the rod and the material that surrounds it, such that different tires can be mounted in a more or less tightened manner on the same rim.

The invention has been implemented with tires that are currently available commercially. However, it would be possible to envision special tires designed to equip the rim according to the invention, for example, by adjusting the inner diameter of the tire by taking into account the contour shape that will be described, or by modifying the inner and/or outer surface of the sides.

The wheel 1 represented in FIG. 1 also has an inflation valve 6. This valve is preferably of a special type, adapted to the contour of the rim and to the tubeless assembly method, but it does not constitute an integral part of the instant invention. Any appropriate valve could also suffice.

FIG. 2 represents the contour of rim 2 according to a preferred embodiment of the invention.

In a known manner, the rim has an upper bridge 10, a lower bridge 11 connected together by two flanks 12 and 13, so as to form a casing. The sides are extended towards the outside by rim flanges 14 and 15 that have, at their ends, respective butts 16, 17. All these different elements are known. As shown in FIG. 2, the upper bridge and the flanges form an annular channel adapted to receive the tire.

The rim 2 has openings for gripping the spokes that are located only in the area of the lower bridge 11. The upper bridge 10 is not bored with openings for the passage or grip of the spokes. As such, FIG. 2 represents an opening 18 located on the lower bridge 11. The opening is threaded to enable the screwing of a nipple or an end piece for gripping the spoke, which is also used to adjust the tension of the spoke. These elements are of any appropriate type and will not be described in further detail.

Preferably, the lower bridge was bored by an extrusion boring technique. According to this technique, instead of being cut, the material is pushed back so as to form a kind of chimney. This chimney ensures that the bridge is not weakened in this area. It also provides an inner surface that can be threaded easily.

This boring method is not restrictive, and any method for gripping the spokes could suffice, whether it be at the lower bridge, or for example, at a rib instead of the lower bridge.

According to the invention, the upper bridge 10 has, in its median portion, an annular rim well 20. The rim well is recessed with respect to the surface of the upper bridge and is narrow. It is demarcated by a base 21 of the rim well oriented parallel to the axis of the rim and two lateral walls 22 and 23. On each side of the rim well, the upper bridge has two lateral seats 24, 25 for the tire beads. The bead seats 24 and 25 also connect the rim well to the two flanges 14 and 15 of the rim. The nominal diameter of the rim corresponds to the external diameter of the bead seats 24 and 25 at their junction with the flanges 14 and 15.

The two lateral walls 22 and 23 of the rim well are substantially parallel with respect to a radial plane, or as has been represented, slightly converging in the direction of the rim well base. In the embodiment illustrated, the angle of inclination is on the order of 10 degrees with respect to a radial plane. Also, the well 20, as defined by the base 21 and the walls 22, 23, is substantially symmetrical with respect to a radial plane, as shown in the axial sectional view of FIG. 2, for example. In fact, the entire rim is substantially symmetrical with respect to a radial plane.

The bead seats 24 and 25 are preferably slightly inclined obliquely so that their external diameter is maximized and then decreases from the walls of the rim well towards the flanges 14 and 15. In a cross section, as has been represented, each of the bead seats has a projecting ridge 24a, 25a adjacent to the rim well, and then one part 24b, 25b that is parallel to the axis and provided as a seat for the beads of the tire. In a variation, the bead seats could have a section with a regular slope from the rim well towards each of the rim flanges.

As will become clearer in the following discussion, it is important that the beads of the tire cross a maximum diameter zone between the rim well and their seats along the flange. As an example, good results have been obtained with a difference of 1 mm between the diameter of the bead seat at the edge of the rim well and the diameter against the flange. A value of 0.35 mm is also satisfactory. Generally, it can be said that a difference in diameter that is comprised between 0.2 and 2 mm suffices. Preferably, the junction between the lateral walls of the rim well and the bead seats is rounded so as to ensure a relative continuity.

Thus, contrary to normal rims, the bead seats do not converge towards the center of the wheel. In fact, the relative distance between the base of the rim well and the peak of the rim flanges is of the same order of magnitude as the relative distance between the center of the bridge and the peak of the rim flanges for a traditional rim. However, since the rim well is bordered here with two oblique bead seats, with a maximum diameter zone, the rim well appears to be narrow and recessed with respect to the contour of a traditional rim.

The dimensions of the rim 2 are determined in the following manner in relation with the diameter of the tire rods.

The nominal diameter of the rim at the junction between the bead seats 24 and 25 and the flanges 14, 15 is substantially equal to the inner diameter of the tire, or slightly more, so as to cause a slight tightening of the rods against the bridge.

In a correlative manner, the maximum diameter of the bead seats, at the peaks of the ridges, is greater than the inner diameter of the tire. In fact, this diameter is greater than the nominal diameter of the rim.

The height of the rim flanges 14 and 15 and the shape of the butts 16 and 17 are determined in the normal manner, so as to obtain a good grip of the tire when it is inflated.

The width of the rim well 20 is substantially equal to the thickness of both beads 30, 31 of the tire pressed against one another, or in other words, the width is provided such that both beads have just enough space to be housed in the rim well. It is also provided such as to cause a slight pinching of the tire beads against one another so that once the tire beads are engaged in the rim well, they tend to become separated naturally from one another and press against the walls of the rim well. For example, one can take as the order of magnitude, an inner width of the rim well comprised between a half and a third of the bridge width measured between the flanges.

The depth of the rim well 20 has an order of magnitude that is equal or less than the height of the flanges 14 and 15 measured beneath the butts. This depth is at least enough for the tire to be mounted according to the operating method that will be described hereinafter.

As a non-restrictive example, an all-terrain bicycle wheel has been made with a rim having a nominal diameter of 560 mm, a diameter at the peak of the flanges of 571 mm, an overall width of approximately 23 mm, and a width of approximately 20 mm between the flanges. The diameter at the peak of the ridges of the bead seats is greater than 0.35 mm with respect to the nominal diameter. The rim well has a width of 7.25 mm and a depth of 3.35 mm. As for the bead seats, they have a width of 7 mm. These values naturally represent only one example of the orders of magnitude.

To mount the tire on the rim, FIG. 4 shows a sectional view of the wheel in the area of the valve. According to the embodiment illustrated, the valve 6 is screwed in the lower bridge 11, and it has, at its end, an injection nozzle that crosses the upper bridge 10 at the base 21 of the rim well 20. The valve 6 thus ends in the base of the rim well 20. A seal is obtained in this area, by any appropriate means, such as an O-ring seal.

The tire is set against the rim and a first side is engaged on the adjacent rim flange. In light of the dimensions defined previously, the side of the tire can be engaged entirely between the two flanges 14 and 15 only if a large portion of its length, at least approximately one half thereof, was previously introduced into the rim well 20 in a first engagement phase of the tire. Over a first part of its length, in the rim well 20, the side of the tire molds to the base of the rim well along a diameter that is smaller than its inner diameter, such that on the opposite side, the side of the tire can cross the butt of the flange which has a greater diameter.

Once the rim flange is crossed, the side of the tire is introduced into the rim well 20 along its entire circumference. It is kept in the rim well due to the fact that the diameter at the peak of the walls 22 and 23 of the rim well is slightly greater than the inner diameter of the tire.

The second side of the tire is introduced in the same way between the two rim flanges, and as with the first side, it is introduced and kept engaged in the rim well.

FIG. 4 illustrates this assembly phase, with the two sides 29 and 30 of the tire engaged in the rim well 20. The narrowness of the rim well and the natural elasticity of the tire structure naturally ensure that the sides are pushed up against the walls 22 and 23 of the rim well 20, such that, as can be seen in FIG. 4, they come naturally into contact with the walls 22 and 23. In order to improve the seal between the sides of the tire and the walls 22 and 23 of the rim well, one could provide, on the external surfaces of the tire sides, towards the beads, a small circular projecting lip. In the area of the beads, provision could be made for nipples or other projecting elements which would act as spacers between the two beads during this assembly phase. These nipples reinforce the support of the tire sides against the walls of the rim well as well as the seal in this area.

As is visible from FIG. 4, the valve 6 ends in the area of the junction between the two beads, and if such is the case, of the aperture that exists between them.

As has been described previously, the sides of the tire take support against the walls 22 and 23 of the rim well. The support pressure against the rim well is not much, but it is enough for the air blown through the valve 6, even under low pressure, to remain in the volume demarcated by the rim well and the tire beads, and then enter the inner volume of the tire, expand its outer envelope, and progressively increase the inner pressure of the tire. This also increases the contact pressure of the sides of the tire against the walls of the rim well and progressively reinforces the seal in this area.

FIG. 5 illustrates this first primary inflation phase of the tire. It must be emphasized that when this first phase begins, there already exists a relative seal between the beads of the tire and the rim well, and then, during this primary phase, the two beads 31, 32 at the base of the sides remain in the rim well, and the seal of the tire takes place between the sides 29 and 30 of the tire and the walls 22 and 23 of the rim well.

As inflation continues, the pressure inside the tire increases, and the structure of the tire subjects the rods to relatively high radial stresses, which cause the rods to be slightly distended. After a certain pressure threshold is exceeded, the extension of the rods becomes enough for the sides of the tire to cross the ridges 24a and 25a of the bead seats, and be positioned against the rim flanges 14 and 15 and their butt 16 and 17, due to the effect of the inner pressure of the tire. Generally, the two sides cross their respective ridges 24a, 25a not simultaneously, but one after another. Once the tire has been positioned, all that one has to do is adjust the inner pressure to the desired pressure. Generally, it is necessary to lower the pressure. FIG. 6 illustrates the tire in this final assembly phase, i.e., in a final tire moounted position.

The tire is thus kept in position against the flanges of the rim. A seal is obtained between the beads of the tire and the upper bridge of the rim. In light of the relatively malleable material of the tire, it has natural sealing capacity in this area. If necessary, the tire surface in this area can be made such that the seal is reinforced even further. Also, with this objective in mind, one preferably uses a tire with an inner diameter that is slightly less than the nominal diameter of the rim, so as to promote the tightening of the tire beads on the bridge of the rim.

In case of a lateral impact, it has been noted that the side of the tire could become dissociated at places from the butt of the flange, whereas for normal impacts, the bead of the tire remained pressed against the flange. The inclination of the bead seats contributes to the retention of the beads 31, 32 of the tire against the flanges. In these conditions, the tire reassumes its shape without any loss of pressure as soon as the impact is over.

In light of the preceding, one can see that the narrow and recessed central rim well is useful for the engagement of the two sides of the tire. In addition, its walls are useful in ensuring a seal for the tire during the primary inflation phase. The inclination or obliqueness of the bead seats is useful in allowing the sides to be retained in the rim well during the entire primary inflation phase. It is also useful, once the tire has been inflated, in the retention of the beads of the tire in case of a lateral impact.

The deflation of the tire is done according to the reverse of the operating method described previously. First, the tire is deflated, either by opening the valve or by disassembling it. Thereafter, one after the other, the sides of the tire are brought into the rim well so as to be able to progressively cross the flanges, if necessary, with the help of an appropriate tool, for example, a tire dismantling tool.

FIG. 7 illustrates an alternative embodiment of the rim according to the invention. According to this variation, a strip of soft material, such as a foam 35 is added to the base of the rim well 34 so as to fill up the base of the rim well. The rim well 34 is deeper than the previous rim well 20, by a height that generally corresponds to the thickness of the strip 35. The thickness of the foam is enough so that the diameter of the rim, when measured at the upper surface of the foam, is greater than the inner diameter of the tire. This foam strip is used in the first phase of the tire assembly. Its aim is to ensure a relative seal between the beads of the tire and the base of the rim well, at least at the start of the primary inflation phase, and not between the sides and the lateral walls of the rim well. This could be, for example, a light foam with closed cells, preferably having a smooth external surface. When the tire is mounted, during their engagement in the rim well, the beads become seated in the foam strip which becomes slightly deformed, on the one hand, to allow the complete engagement of the tire, and on the other hand, to be adapted to the inner diameter of the beads, once the sides of the tire are engaged in the rim well.

The valve ends in the inner volume of the tire. The inflation technique is the same as the one described previously. During the initial priming, air is captured between the envelope of the tire and the upper surface of the foam.

After the initial inflation priming is over, the beads of the tire become separated, and take support against the walls of the rim well, as has been described previously. Then, the rods are deformed and the beads are installed on the seats, after crossing the ridges, or as the case may be, the maximum diameter zone.

Advantageously, with this variation, the rim well can be wider, and indeed, it is no longer necessary to elastically pinch the two sides between the edges of the rim well for the primary inflation to begin, because the initial seal occurs between the bead and the upper surface of the foam. In addition, in view of the width-wise elasticity of the foam, the manufacturing tolerances for the tire can be broader.

Materials other than foam could be used to cover the rim base, as long as it forms a strip that increases the perimeter of the rim base and as long as its upper surface is deformable.

The present description has been provided only as an example, and one could adopt variations thereof without leaving the scope of the invention. These variations could be especially related to the spoke grips and the inner shape of the rim flanges and hooks. For example, the flanges could have lips or other projecting contours so as to improve the grip of the tire. Other variations are also possible.

In addition, the invention is also related to the so-called hook rims. These rims are different from the butt rims in the shape of the upper bridge and the shape of the flanges that retain the tire. In order to apply the invention to these rims, one would only have to replace the upper bridge by a bridge having a less hollow overall shape, and which has a central rim well and two lateral bead seats with a ridge or other similar element along the rim well, with a diameter that was greater than the theoretical inner diameter of the tire, so as to retain the tire in the rim well during the entire primary inflation phase.

Finally, it is to be understood that the invention also encompasses a wheel having a rim as described, connected to a hub via spokes, as well as a complete wheel equipped with a tire mounted in the manner described hereinabove.

What is claimed is:

1. A tubeless tire-engaging structure for a bicycle wheel, said structure comprising:

an annular channel forming an outer periphery of the wheel, said annular channel comprising a bridge and two lateral flanges, said bridge having a recessed central well, said central well comprising a base and two lateral walls, said well having a width to facilitate engagement and retention of a pair of tire beads within said well, whereby the pair of tire beads touch each other at least before a primary tire inflation phase to facilitate inflation of the tire, said annular channel further comprising seats for the tire beads during a subsequent tire inflation phase on opposed lateral sides of said well between said well and respective ones of said flanges, said bead seats extending obliquely from an edge of said well towards respective ones of said flanges, and said bead seats having, adjacent said well, a maximum diameter zone, said maximum diameter zone being greater than a diameter of said bead seats adjacent said flanges.

2. A tubeless tire-engaging structure for a bicycle wheel as defined by claim 1, wherein each of said bead seats comprises a ridge adjacent said well, and each of said bead seats further includes a portion extending towards a respective one of said flanges and parallel to a central axis defined by the annular channel.

3. A tubeless tire-engaging structure for a bicycle wheel as defined by claim 1, wherein said maximum diameter zone of said bead seats adjacent said well is greater than said diameter of said bead seats adjacent said flanges by a value of between 0.2 and 2 mm.

4. A tubeless tire-engaging structure for a bicycle wheel as defined by claim 1, wherein said width of said well is between a third and a half of the width of the bridge measured between said flanges.

5. A tubeless tire-engaging structure for a bicycle wheel as defined by claim 1, wherein said lateral walls of said well are inclined by approximately 10 degrees with respect to a radial plane of said annular channel.

6. A tubeless tire-engaging structure for a bicycle wheel as defined by claim 1, wherein said base of said well is equipped with a strip of foam having a smooth upper surface and being elastically deformable.

7. A tubeless tire-engaging structure for a bicycle wheel as defined by claim 1, wherein said structure comprises a rim for a bicycle wheel.

8. A tubeless tire-engaging structure for a bicycle wheel as defined by claim 7 in combination with a central hub and a plurality of spokes connecting said central hub to said rim, thereby forming a bicycle wheel.

9. A tubeless tire-engaging rim for a bicycle wheel, said rim comprising:

a lower bridge, an upper bridge, lateral sides extending between said lower bridge and said upper bridge, said lateral sides extending radially outwardly beyond said upper bridge to form lateral flanges, the tire to be retained between said lateral flanges;

said upper bridge having a rim well recessed in a central portion of said upper bridge between said lateral flanges, said rim well comprising a base and a pair of lateral walls extending from said base, said well having a predeterminately sized width to facilitate positioning a pair of tire beads of a tubeless tire in mutual contact within said well before a primary tire inflation phase to facilitate inflation of the tire;

said upper bridge further comprising laterally opposed bead seats for seating the pair of tire beads, said upper bridge further comprising laterally opposed ridges, each of said ridges being positioned between a respective one of said bead seats and a respective one of said lateral walls of said rim well, said ridges comprising a zone of said upper bridge having a greater diameter than a diameter of said bead seats.

10. A rim according to claim 9, wherein said lateral flanges are substantially parallel with respect to a radial plane.

11. A rim according to claim 9, wherein said lateral walls slightly converge toward said base of said well.

12. A rim according to claim 11, wherein said laterals walls converge at an angle of about 10° with respect to a radial plane.

13. A rim according to claim 9, wherein said upper bridge is substantially symmetrical with respect to a radial plane.

14. A rim according to claim 9, wherein the rim is substantially symmetrical with respect to a radial plane.

15. A rim according to claim 9, wherein said bead seats of said upper bridge extend substantially parallel to an axis defined by the rim.

16. A rim according to claim 9, wherein said ridges have a maximum diameter zone greater than a diameter of said bead seats by a value between 0.2 and 2.0 millimeters.

17. A rim according to claim 9, wherein said width of said well is between one-third and one-half of the width of said upper bridge measured between said flanges.

18. A rim according to claim 9, wherein a strip of elastically deformable foam material is positioned on said base of said well, said strip having a smooth upper surface.

19. A rim according to claim 9 in combination with a central hub and a plurality of spokes connecting said central hub to said rim, thereby forming a bicycle wheel.

20. A tubeless tire-engaging structure for a bicycle wheel, said structure comprising:

an annular channel forming an outer periphery of the wheel, said annular channel comprising a bridge and two lateral flanges, said bridge having a recessed central well, said central well comprising a base and two lateral walls, said well having a width to facilitate receiving a pair of tire beads within said well, a strip of soft material positioned within said well for engagement with said pair of tire beads within said well before a primary tire inflation phase to facilitate inflation of the tire, said annular channel further comprising seats for the tire beads during a subsequent tire inflation phase on opposed lateral sides of said well between said well and respective ones of said flanges, said bead seats extending obliquely from an edge of said well towards respective ones of said flanges, and said bead seats having, adjacent said well, a maximum diameter zone, said maximum diameter zone being greater than a diameter of said bead seats adjacent said flanges.

21. A tubeless tire-engaging structure for a bicycle wheel as defined by claim 20, wherein said strip of soft material comprises an elastically deformable material.

22. A tubeless tire-engaging structure for a bicycle wheel as defined by claim 21, wherein said elastically deformable material comprises a foam having a smooth upper surface.

* * * * *